Figure 1:
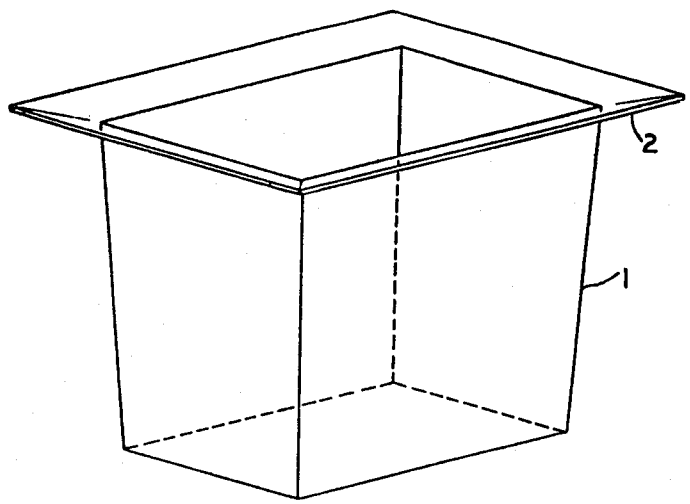

United States Patent [19]

Balkwill et al.

[11] 4,345,693

[45] * Aug. 24, 1982

[54] AIR AND MOISTURE BARRIER FOR ELECTRICAL OUTLET BOXES

[76] Inventors: G. Russell Balkwill, 2429 Howard Ave., Windsor, Ontario, Canada, N8X 3Y5; Jules P. Robinet, 2865 Virginia Park, Windsor, Ontario, Canada, N9E 2B8; John F. Tamasovics, 2530 Todd La., Windsor, Ontario, Canada

[*] Notice: The portion of the term of this patent subsequent to Jun. 19, 1996, has been disclaimed.

[21] Appl. No.: 176,571

[22] Filed: Aug. 4, 1980

Related U.S. Application Data

[63] Continuation of Ser. No. 36,436, May 7, 1979, abandoned, which is a continuation of Ser. No. 908,223, May 22, 1978, Pat. No. 4,158,420.

[51] Int. Cl.³ .............................................. H02G 3/08
[52] U.S. Cl. .................................... 220/3.3; 220/3.92; 220/3.94; 52/220
[58] Field of Search ...................... 220/3.92, 3.94, 3.2, 220/3.3, 3.4, 3.5, 3.6; 174/57; 52/220, 221

[56] References Cited

U.S. PATENT DOCUMENTS

| | | | |
|---|---|---|---|
| 2,997,520 | 8/1961 | Kinsman | 220/3.8 |
| 3,126,160 | 3/1964 | Berger | 220/3.94 |
| 3,622,029 | 11/1971 | Ware | 220/3.94 |
| 3,690,501 | 9/1972 | Ware | 220/3.94 |
| 3,892,911 | 7/1975 | Codrino | 220/3.94 |
| 4,158,420 | 6/1979 | Balkill et al. | 220/3.92 |
| 4,167,196 | 9/1979 | Morris | 220/3.8 |

FOREIGN PATENT DOCUMENTS

| | | | |
|---|---|---|---|
| 2038820 | 2/1922 | Fed. Rep. of Germany | 220/3.2 |
| 1077870 | 8/1967 | United Kingdom | 220/3.92 |

*Primary Examiner*—Joseph Man-Fu Moy
*Attorney, Agent, or Firm*—Allen D. Gutchess, Jr.

[57] ABSTRACT

This invention consists of a transparent non-inflammable plastic container the purpose of which is to enclose an electrical outlet box to prevent air and water or moisture from entering into or passing through such box. The container is in the form of a rectangular box for use with rectangular outlet boxes, and is round for use with round or octagonal outlet boxes. Each of the containers is provided with a flange around the open rim of it, and said flange extends outwardly and at a small angle to the wall of the container.

3 Claims, 3 Drawing Figures

AIR AND MOISTURE BARRIER FOR ELECTRICAL OUTLET BOXES

This is a continuation division, of application Ser. No. 036,436 filed May 7, 1979 now abandoned, which is a continuation of Ser. No. 908,223 filed May 22, 1978, now U.S. Pat. 4,158,420.

This invention consists of a container which is used to cover electrical outlet boxes, for the purposes of preventing cold air from entering, and heated air from escaping, from the interior of buildings in which such boxes are installed; and to prevent water or moisture from entering such boxes.

The present method of installing outlet boxes allows air which is activated by winds to enter the building from the outside and permits the escape of warm air from the building through these boxes. Furthermore, many building fires and electrocutions are caused by short circuits originating in these outlet boxes because moisture can enter into them quite easily.

It is therefore the primary object of this invention to provide a means for making electrical outlet boxes as air and moisture proof as possible without the necessity of redesigning such boxes nor radically changing the established method of installation.

This is accomplished by the invention by providing a cover for the outlet box, which is air and water proof for all practical purposes, and which can be installed concurrently with the installation of the outlet box.

Figure 2:
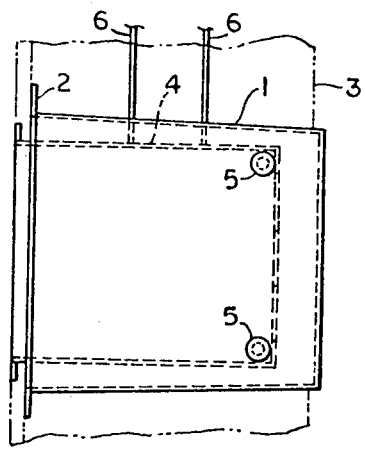
Figure 3:
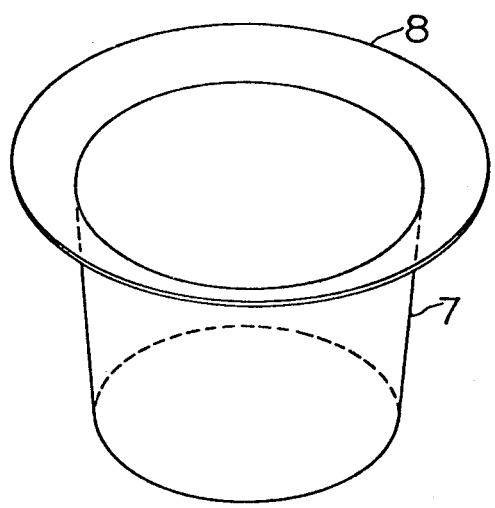

In describing the invention reference will be made to the attached drawings in which, FIG. 1 is an isometric view of the invention, FIG. 2 shows the method of installing the invention, and FIG. 3 shows a variation in the shape of the invention.

In the drawings the invention is shown consisting of a rectangular, transparent plastic container 1 having an open top, the six of which is provided with a flange 2 which slants upwardly or away from the box 1 at a small angle.

The container 1 is made large enough to fit freely over a standard electrical outlet box 4, and this outlet box together with irs plastic cover 1 is nailed to a building stud 3, in the usual manner of installation, with nails 5,5. The insulated electrical wires 6,6, are led from the box 4 through punched holes in the container 1. These holes can be made small enough to provide a tight fit for the insulated wires 6, to prevent any air or moisture from entering into the container 1. If required, and as a further precaution, a sealing compound can be pasted around the said wires at their exit from the container 1.

In FIG. 3, is shown a variation 7 in which the container 1 is changed to a round shape in order to conform with electrical outlet boxes which are round or octagonal in shape.

The installation of the outlet box with its container is shown in FIG 2. The box 4 is placed into the container 1 or 7, as the case may be, so that the open face of the outlet box 4 is flush with the face of the interior wall of a building; the flange 2 or 8 of the container 1 or 7, respectively, is pressed tightly against the said building wall; and both the outlet box and its container are nailed to a stud 3. By pressing the flanges of the said containers against the wall before nailing, the said flanges assume a position almost at rightangles to the container walls, and thereby form a tight seal which stops air or moisture to pass through the container and into the outlet box.

It is preferable to fabricate the containers 1 or 7 out of a transparent plastic material, and particularly of a plastic which is fireproof or fire retarding, so that the interior can be observed and so that any flash due to a short circuit occuring within the container will be prevented from igniting any adjacent structural wood.

Having described my invention, what I claim is:

1. In combination, a rigid electrical outlet box having an open face, a cover of flexible plastic material of the same shape but slightly larger than the electrical outlet box extending around and enclosing all sides and the back of said outlet box opposite the open face so that the open face remains uncovered, to form an air and vapor barrier around the sides and back of said box, said cover having a flexible, thinwall flange around the perimeter near the open face of said box and extending outwardly therefrom and slanting away from said cover, whereby the peripheral edge of the flange can tightly contact the back surface of a wall or the like around the open face of the outlet box and on the same side of the wall or the like as the outlet box, and the cover provides a barrier to prevent water from entering the outlet box through the sides and back thereof.

2. A cover for enclosing an electrical outlet box having an open face generally flush with a building wall or the like, said cover being made of a flexible plastic material, said cover being of a size and shape to fit over and enclose the sides and the back of the electrical box opposite the open face so that the open face of the electrical box remains uncovered, said cover having an open side for receiving the outlet box, said cover otherwise being devoid of any openings when assembled with the electrical outlet box, said cover having a flexible thin-wall flange around the entire perimeter of the open side and extending outwardly therefrom, all of said flange slanting away from the cover and the outlet box and having an outer slanting surface facing toward the back surface of the wall or the like around the outlet box, whereby the peripheral edge of the flange can tightly contact the back surface of the wall or the like around the outlet box on the same side of the wall or the like as said outlet box to prevent cold air from entering and heated air from escaping through the sides and back of the outlet box and to prevent water from entering the outlet box through the sides and back thereof.

3. In combination, an interior building wall or the like having a front face and a back surface, an electrical outlet box having an open face generally flush with the front face of the wall or the like and extending beyond the back surface of the wall or the like, and a cover made of a flexible plastic material, said cover being of the same shape as the electrical outlet box and slightly larger to receive and enclose the sides and the back of the electrical outlet box which project through the back surface of the wall or the like, said cover having an open side in which said outlet box is received, said cover having a narrow, flexible, thin-wall flange around the perimeter of the open side and extending outwardly therefrom, said flange being in a stressed condition in contact with the back surfaces of the wall or the like from which said electrical box projects, with the outer peripheral portions of the flexible, thin-wall flange exerting greater pressure against the back surface of the wall or the like than the inner portions of the flange, said cover totally enclosing said sides and back of said outlet box, and having openings where wires enter said box with those openings providing a tight fit with the wires to prevent any air or moisture from entering the cover, and said cover being affixed to said outlet box.

* * * * *